United States Patent [19]

Treichel et al.

[11] Patent Number: 5,301,712
[45] Date of Patent: Apr. 12, 1994

[54] SLIDE VALVE

[75] Inventors: Lee E. Treichel, Fulshear, Tex.; Gary J. Baumgartner, Leawood, Kans.

[73] Assignee: Tapco International, Inc., Houston, Tex.

[21] Appl. No.: 90,402

[22] Filed: Jul. 12, 1993

[51] Int. Cl.[5] .............................................. F16K 25/04
[52] U.S. Cl. .................................... 137/375; 251/329; 137/315
[58] Field of Search ................ 137/315, 375; 251/328, 251/329, 367

[56] References Cited

U.S. PATENT DOCUMENTS

| 2,787,438 | 4/1957 | Bauer | 251/329 |
| 3,964,507 | 6/1976 | Jandrasi et al. | 137/375 |
| 4,693,452 | 9/1987 | Jandrasi | 251/329 |

Primary Examiner—A. Michael Chambers
Attorney, Agent, or Firm—James F. Weiler

[57] ABSTRACT

Disclosed is a slide valve for high temperature and/or abrasive service having a metal shell and a liner of refractory material forming a flowway having an inlet and an outlet and an orifice opening between them. A side opening closed by a removable bonnet intersects the flowway at the orifice opening and is provided with grooves extending transversely from the side opening to each side and beyond the orifice opening and forming upstream and downstream guide and slide shoulders. An orifice plate with an orifice is slidable into and out of position through the side opening, a slide or disc is slidable in the guides for movement to open, closed, and throttling positions. The orifice plate has a seal around its orifice which sealingly engages the upstream shoulder.

3 Claims, 3 Drawing Sheets

SLIDE VALVE

FIELD OF THE INVENTION

This invention relates generally to a slide control valve for high temperature and/or abrasive surface, such as used in all refineries. More particularly, it relates to improved valves of this type in which wear prone parts are insertable and removable through the bonnet opening of the valve without the necessity of removing the valve from the line.

BACKGROUND ART

As described in U.S. Pat. No. 3,726,306, slide control valves of this type are generally quite large having internal diameters ranging in size from 6 inches to 8 feet. Due to the services in which they are used, it is often necessary to repair or replace their internal parts including the slide. Obviously, it is desirable that this be done without taking the valve body out of the flow line in which it is installed.

In use, the slide of a valve of this type normally occupies a throttling position and is opened or closed depending on the type of valve or service, during start up, and in the event of an emergency. Since flow through the valve is normally in a vertical direction, the slide must be supported in the valve body; and due to the size of the slide and the impingement of the flow on the slide which partially closes the valve orifice, this vertical positioning of the valve imposes considerable load on the structure in the valve body on which the slide is supported. Consequently, there is a need to guide the slide or gate as it is moved between its flow controlling positions.

As shown in the aforementioned patent, the side edges of the slide are guidable reciprocally within guides between a seat ring or orifice plate and the body of the valve. The slide, guides, and orifice plate can be preassembled to permit them to be moved as a unit through a side opening in the body of the valve and then secured thereto to dispose the orifice in alignment with the flowway in order to smooth out turbulent flow through the valve. As explained in this patent, this structure not only permits the installation and removal of the internal parts as unit, but also minimizes distortion, binding, and wear by maintaining tolerances between the internal parts and the valve body due to thermal and mechanical stress.

In valves of this type where the slide is normally in throttling position, it is not necessary to maintain a tight seal between the slide and the seat surrounding the orifice in the orifice plate. The slide may have a T-slot connection with the stem of an actuator mounted on a bonnet removably installed on the body over the side opening, whereby the slide is free to shift into tight, load bearing engagement with the downstream guide surfaces.

In valves of this type manufactured and sold by Tapco, a division of Triten Corporation of Houston, Tex., the outer metal body is lined with a refractory material. Alternatively, the valve body may be lined with insulating material and the latter lined with refractory material. This results in a so-called "cold shell" design wherein external body temperatures are minimized.

Although these valves have experienced considerable success, they nevertheless require the fabrication of a large number of internal parts and considerable time and effort involved in assembling and disassembling them. The time and the cost involved in fabricating valves such as the type shown in the above-identified patent is significant; these costs are multiplied in the case of valves having larger internal diameters in large part because of the difficulties in maintaining precise tolerances across large diameters. These costs are further increased by valves such as a diverter valve having, for instance, a 96 inch inlet diameter and two side-by-side outlets each having an internal diameter of 96 inches such that the guides must be at least 16 feet long plus the distance the outlets are spaced apart. The difficulties in handling the internal parts of such a valve are alone a significant disadvantage of this construction.

The present invention is directed to such a valve in which an improved orifice plate, removable guides, and slide valve are provided so that they can be readily and easily inserted by sliding in place, and removed, repaired, and replaced through the bonnet without disassembling or removing the valve from the flow line.

The following represent the patent state of the art in addition to U.S. Pat. No. 3,726,306 mentioned above.

U.S. Pat. No. 4,531,539 discloses a slide valve whereby wear prone parts are removable without taking the valve off line. The valve is refractory insulated (Column 4, line 23).

U.S. Pat. No. 4,512,363 discloses a slide valve with guides held in place by a clamping action and is refractory lined (Column 3, line 33).

U.S. Pat. No. 4,458,879 discloses a slide valve with refractory lining using no screws or fasteners. Guides are maintained out of the flow path and held in place by a clamping action.

U.S. Pat. No. 5,123,440 discloses a slide valve with a slide or gate covered by a layer of refractory but uses clamping bolts.

U.S. Pat. No. 4,645,179 discloses a gate valve with self-aligning sealing gaskets which may be readily replaced.

U.S. Pat. No. 4,541,453 discloses a slide valve with refractory insulating material whereby the slide is held in tension.

U.S. Pat. No. 4,378,817 discloses a slide valve closure member held in place by guides and packed with refractory material but makes adjustments with fasteners.

U.S. Pat. No. 4,275,763 discloses a double slide valve with a refractory lining.

U.S Pat. No. 4,253,487 discloses a slide valve with a refractory lining.

U.S. Pat. No. 3,976,094 discloses a slide valve with a refractory layer but uses bolts.

U.S. Pat. No. 3,701,359 discloses a slide valve with refractory lining.

Disclosure of the Invention

The slide valve according to the present invention has a liner of refractory material, preferably securely cast to the inside of a metal shell, which refractory material has high compressive strength sufficient to carry the load through the valve. The refractory material has a flowway therethrough with an inlet and an outlet and a side opening intermediate the inlet and the outlet, and a groove in each side of the lining extending transversely from the side opening beyond the flowway forming opposed downwardly facing upstream shoulders and upwardly facing downstream shoulders. An orifice plate having an orifice is slidable through the side opening into position under the upstream shoulders providing an orifice for the flowway. A pair of guides are provided, one each slidable from the side opening into position under the orifice plate and effective to support the orifice plate in position against the upstream shoulder by being supported on the downstream shoulder, the orifice plate, the guides, and the downstream shoulder having interfitting keys and grooves arranged to slide the orifice plate into position against the downwardly facing upstream shoulder, and the guides into position against the bottom of the orifice plate and the downstream shoulder. The guides have inwardly extending shoulders effective to provide a guideway for a slide valve and are supported by the downstream shoulder, and the slide valve has a side movable through the side opening into and out of position having slide portions which are received by the guideway for guided reciprocation between positions controlling flow through the flowway. An actuator is provided for reciprocation of the slide through a bonnet removably mounted over the side opening and a stem extending sealably through the bonnet into the side opening. Sealing means are provided between the orifice plate and the upstream shoulder, the guides clamping or holding the orifice plate against the upstream shoulder effective to provide a seal between the orifice plate and the upstream shoulder.

Thus, the wear prone parts, that is the orifice plate, the guides and the slide valve are removable and replaceable through the bonnet by simply sliding them into and out of position, erosive bypassing is eliminated or reduced, and screws, bolts, or other fasteners are eliminated.

Accordingly, it is an object of the present invention to provide a slide control valve for high temperature, high abrasive use, such as use in oil refineries, and in which the wear prone parts, that is the orifice plate, the guides, and the slides are readily insertable and removable and replaceable by sliding them into position through the bonnet without the necessity of removing the valve from the line and without the use of any screws, bolts, or other fasteners.

It is yet another object of the present invention to provide such a slide control valve in which a refractory liner bears and supports the load on the slide.

A still further object of the present invention is the provision of such a control slide valve which eliminates and reduces erosive bypassing of the slide of the valve.

A still further object of the present invention is the provision of such a control slide valve in which a seal is provided by a clamping action between the orifice plate and a downwardly facing upstream shoulder of the liner thereby providing an effective seal.

Other and further objects, features, and advantages of the invention are set forth throughout the specification and claims and are inherent in the invention.

BEST MODES FOR CARRYING OUT THE INVENTION

Figure 1:
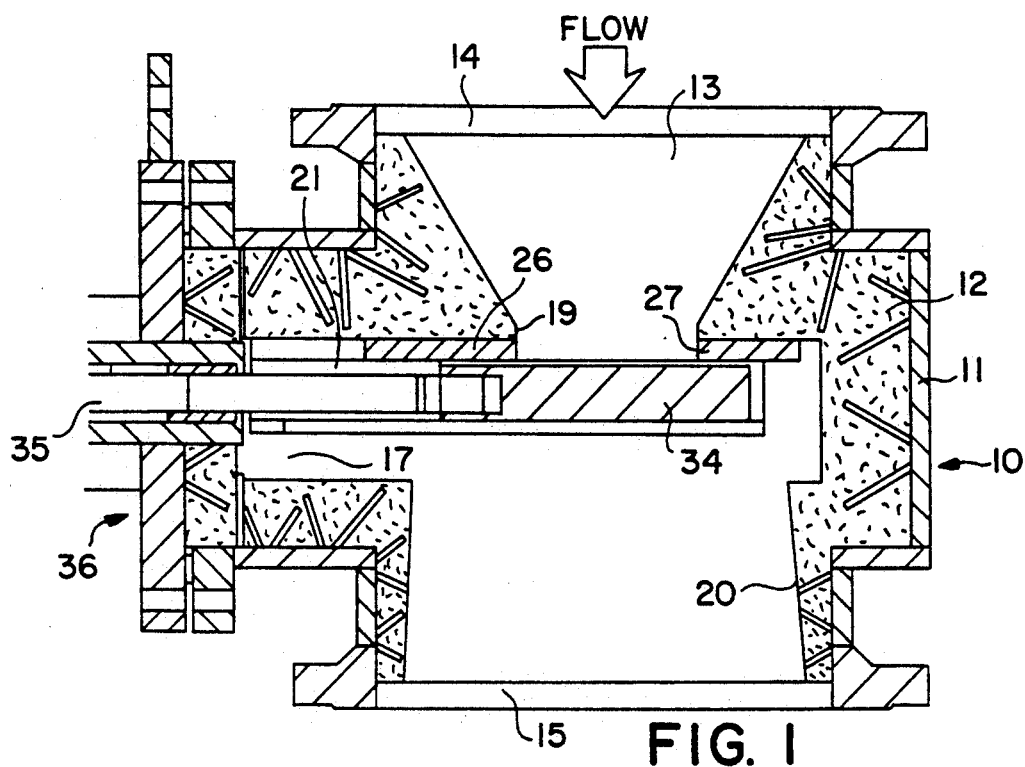
FIG. 1 is a side cross sectional view of a slide valve according to the invention.
Figure 2:
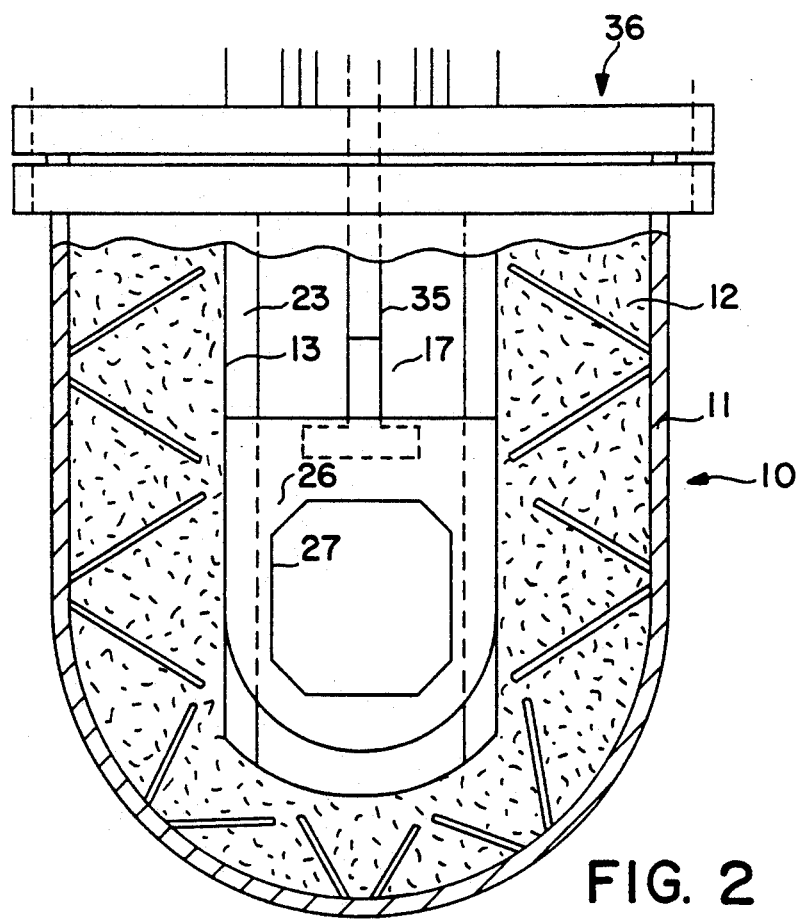
FIG. 2 is a top cross sectional view of the slide valve of FIG. 1.
Figure 3:
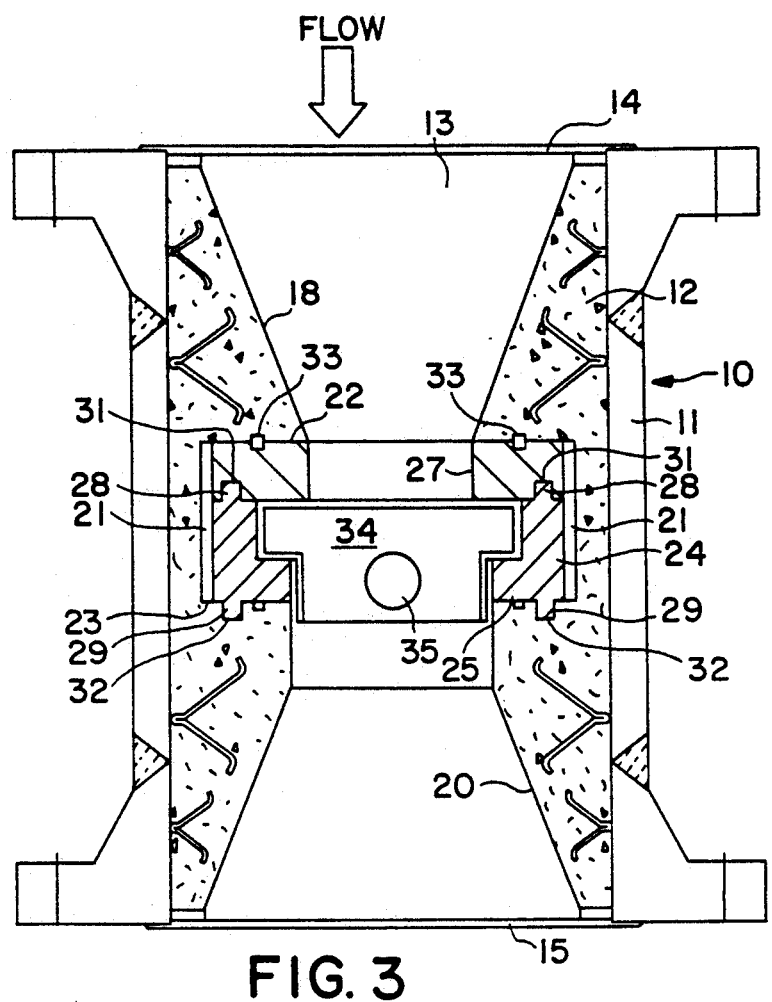
FIG. 3 is an elevation in section of the slide valve of FIGS. 1 and 2 looking in from the bonnet opening.

With reference to FIGS. 1, 2, and 3 of the drawings, the overall valve, which is indicated in its entirety by reference character 10, comprises a metal shell 11 and a lining 12 of refractory material which, preferably, has been cast in place and thus secured on the inner surface of the metal shell to form a flowway 13 therethrough. A metal mesh, diagrammatically shown, is secured to the inner surface of the metal shell 11, such as by welding, and the refractory material is cast in place and then shaped, such as by the use of molds, trawling, and the like to form the flowway 13. The flowway 13 is arranged vertically and includes an inlet 14 at its upper end, an outlet 15 at its lower end, and a side opening 17 therein which intersects the flowway 13 intermediately the inlet 14 and outlet 15. In valves of this type, the inlet is connected to a process flow line (not shown) and the outlet is connected to a downstream flow line, not shown. The cast refractory lining 12 forming the inlet 14 has a conical surface 18 which extends downwardly and inwardly from its upper end toward an orifice opening 19 at its intersection with the side opening 17, and a conical surface 20 which extends downwardly and outwardly from the orifice opening 19 to the outlet 15. The refractory lining 12, whether cast in place or not, is capable of withstanding the load through the valve. If the refractory lining is not cast in place, it can be supported by a body member such as disclosed by U.S. Pat. No. 2,575,464.

Figure 6:
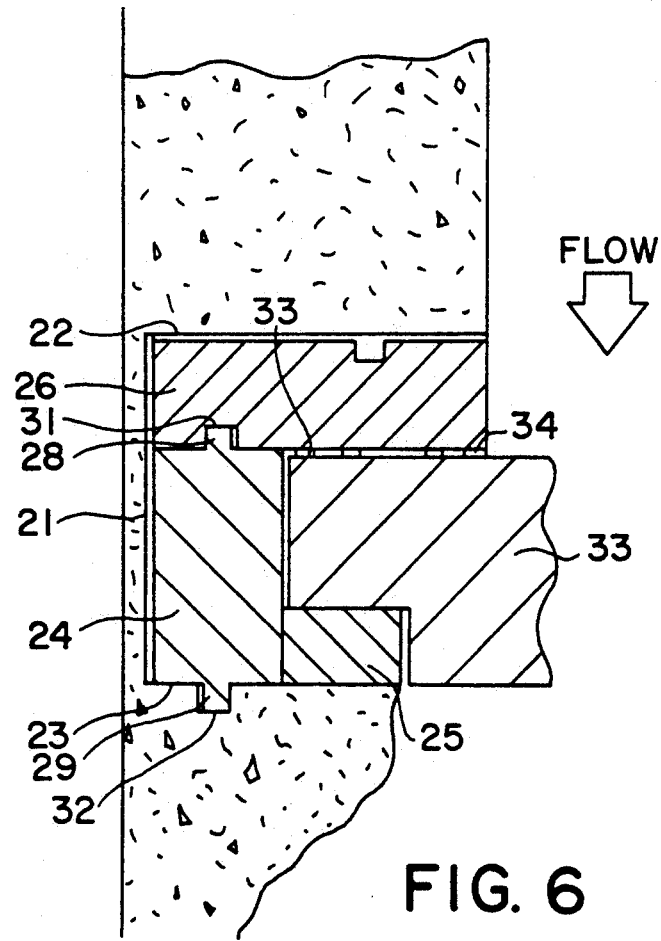
FIG. 6 is a fragmentary elevational section view illustrating the guides, slide valve, and orifice plate of FIGS. 1, 2, 3, and 4.

As best shown in FIG. 6, the flowway 13 has grooves 21 formed in its opposite sides facing each other, each groove providing an upstream downwardly facing guide surface 22 and a downstream upwardly facing guide and support surface 23 on each side of the orifice opening 19. The groves 22 and 23 each extend transversely from the side opening 17 to beyond the orifice 19 at its intersection with the flowway 13. Disposed in each groove is an elongated guide 24 which has an inwardly extending load bearing guide shoulder 25. The guides 24 extend a substantial distance from the side opening beyond the orifice opening 19 so that they can be inserted and removed simply by sliding them into and out of place through the side opening 17. The grooves 21 are provided back of and out of the direct flow path of flow of abrasive materials.

Figure 4:
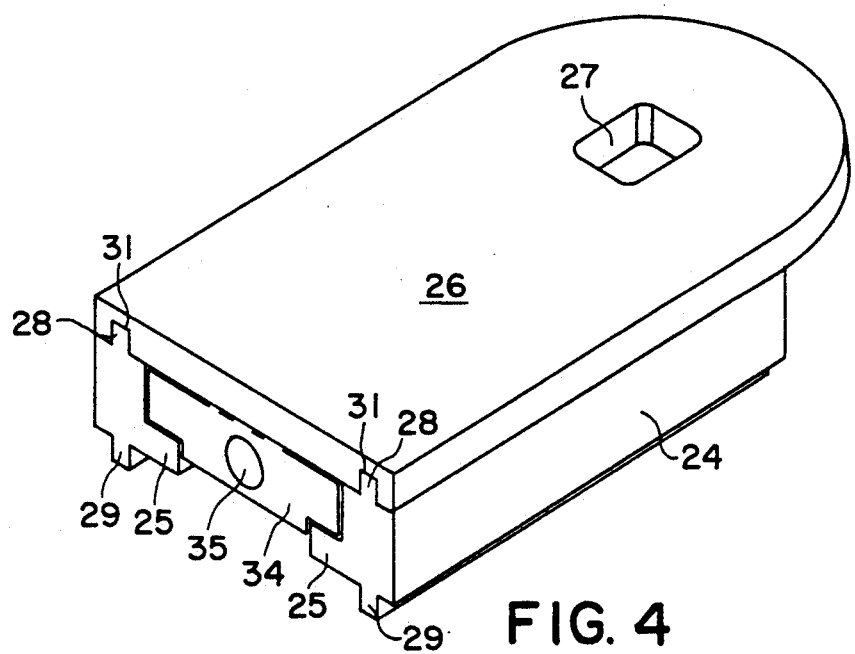
FIG. 4 is a perspective view of the orifice plate, guides, and slide valve assembly of the invention.
Figure 5:
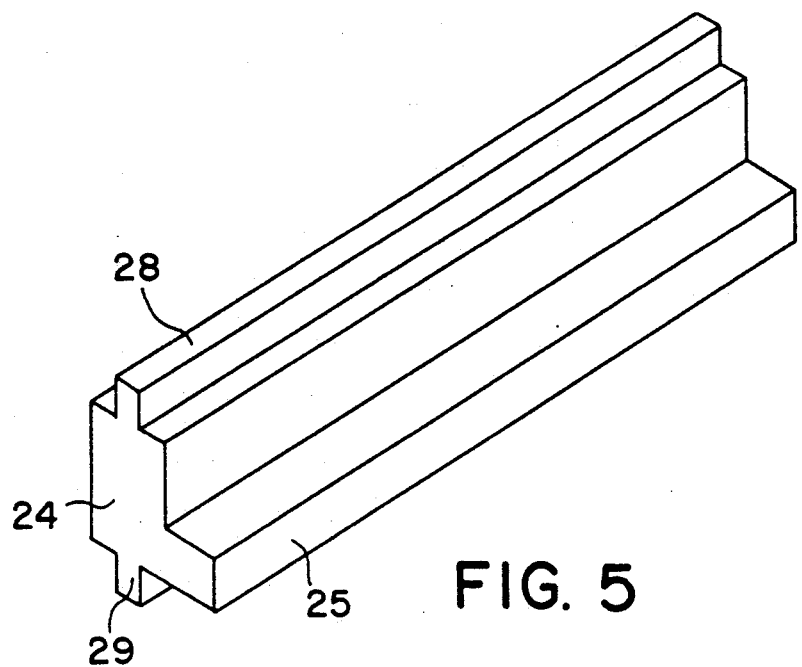
FIG. 5 is a perspective view of one of the guides, as best shown in FIGS. 3 and 4.

As illustrated in FIGS. 1, 1, 3, and 4, an orifice plate 26 having an orifice 27 is slidable disposed through the side opening 17 and is supported in place by the guides 24. Disposed at the upper ends and lower ends of the guides 24 are the keys 28 and 29 which extend along the length of the guides 24 and which interfit into the key ways 31 and 32 in the orifice plate 26 and the upwardly facing downstream shoulder 23, respectively. The interfitting keys and key ways are provided so that the guides 24 are slidable into and out of position, as illustrated, from the side opening 17 and also maintain the orifice plate 26 in position.

In inserting the orifice plate 26 and guides 24 in position, the orifice plate 26 is first placed into position under the downwardly facing upstream shoulders 22 and then each of the guides 24 are moved into place as illustrated in FIG. 3. The orifice plate 26 has suitable sealing means, such as the O ring gasket 33 at its upper surface which surrounds the orifice 27. The guides 24 when in place provide an upward force on the orifice plate 26 and provide a clamping action which cause the sealing means 33 to provide a seal between the upstream shoulder 22 and the orifice plate 26.

A disc or slide 33 is provided which has the projecting side portions 34 which slidably fit in the guides 24 for movement into open, closed, and a partially open or throttling position.

The disc slide valve 33 is reciprocated between these positions by means of an actuator rod 35 which is connected to the disc or slide 33 and which sealingly extends through the bonnet 36. The actuator rod 35 is actuated by suitable means, not shown, and has suitable stuffing box or sealing arrangements which are conventional in valves of this type.

Thus, the wear prone parts, that is the slide valve, orifice plate, and guides are readily removable and replaceable by sliding them into position through the bonnet and sliding them out through the bonnet for replacement, repair, and the like, without utilizing threaded connections, bolts, fasteners, and without having to remove the valve from the line.

Any refractory material having sufficiently high compressive strength so as to be suitable for carrying the load transmitted by the slide 33 can be used for the liner and is available from a number of suppliers, including Harbison Walker (Pittsburgh, Pa.), National Refractories (Oakland, Calif.), Norton Co. (Worchester, Mass.), The Carborundum Co. (Niagara Falls, N.Y.), Resco Products, Inc. (Morristown, Pa.), Plibrico (Chicago, Ill.), and A. P. Green (Mexico, Mo.). Any such refractory material having a modulus of rupture (MOR) over about 1200 psi at normal operating temperatures (about 1400 to about 1900 psi is preferred) is suitable for use in the present invention, and many commercially available composites can either be modified by adding alumunina and/or zirconia to increase MOR or by varying such parameters as aggregate size, cooling rate, pressure, percentage solids, vibration frequency, all as are known in the art, to maximize the strength thereof for use in accordance with the present invention.

The present invention, therefore, is well suited and adapted to attain the objects and ends and has the features and advantages mentioned as well as others inherent therein.

While presently preferred embodiments have been given for purpose of disclosure, changes can be made therein which are within the spirit of the invention as defined by the scope of the appended claims.

What is claimed is:

1. A slide valve for high temperature and/or abrasive service comprising,
   a body having an outer metal shell and a lining of refractory material forming a flowway therethrough having an inlet and an outlet and a side opening intersecting the flowway intermediate the inlet and the outlet,
   a groove disposed in each side of the lining extending transversely from the side opening beyond and on opposite sides of the flowway forming opposed downwardly facing upstream shoulders and upwardly facing downstream shoulders on each side of the flowway,
   an orifice plate having an orifice slidable through the side opening in the grooves into position adjacent the upstream shoulder providing an orifice for the flowway,
   a pair of guides, one each slidable from the side opening on the downstream shoulder into position under the orifice plate effective to support the orifice plate in position against the upstream shoulder while being supported on the downstream shoulder,
   the orifice plate, the guides, and the downstream shoulder having interfitting keys and grooves arranged to permit sliding of the orifice plate and guides into position against the upstream shoulder and supported by the downstream shoulder,
   the guides having inwardly extending shoulders effective to provide a guideway and be supported by the downstream shoulders,
   a slide movable through the side opening having slide portions which are received by the guideway for guided movement between positions controlling flow through the orifice,
   a removable bonnet closing the side opening,
   a stem extending sealably through the bonnet and connected to the slide for movement between positions controlling flow through the orifice, and
   sealing means on the orifice plate's upper surface surrounding the orifice, the guides holding the orifice plate against the downwardly facing upstream shoulder effective to provide a seal between the orifice plate and the upstream shoulder.

2. The slide valve of claim 1 where,
   the grooves are disposed back of and out of direct flow through the flowway.

3. The slide valve of claim 1 where,
   the inlet is cone shaped and extends downwardly and inwardly, and
   the outlet is cone shaped and extends downwardly and outwardly.

* * * * *